United States Patent [19]

Hunter et al.

[11] Patent Number: 4,559,066

[45] Date of Patent: Dec. 17, 1985

[54] FILTERS FOR PURIFICATION OF GASES

[75] Inventors: George S. Hunter, Richmond; Brian Walker, Washington; Kenneth Merrie, High Shincliffe, all of England

[73] Assignee: Process Scientific Innovations Limited, Durham, England

[21] Appl. No.: 668,690

[22] Filed: Nov. 6, 1984

Related U.S. Application Data

[63] Continuation of Ser. No. 442,060, Nov. 16, 1982, abandoned.

[30] Foreign Application Priority Data

Nov. 16, 1981 [GB] United Kingdom ............... 8134450
Oct. 28, 1982 [GB] United Kingdom ............... 8230850

[51] Int. Cl.⁴ .......................................... B01D 27/02
[52] U.S. Cl. ...................................... 55/274; 55/316; 55/387; 55/498
[58] Field of Search ................ 55/316, 387, 274, 498

[56] References Cited

U.S. PATENT DOCUMENTS

| | | | |
|---|---|---|---|
| 3,029,581 | 4/1962 | Robbins | 55/316 |
| 3,841,484 | 10/1974 | Domnick | 55/274 |
| 3,891,417 | 6/1975 | Wade | 55/316 |
| 4,111,815 | 9/1978 | Walker et al. | 55/486 |
| 4,141,703 | 2/1979 | Mulchi | 55/316 |
| 4,366,054 | 12/1982 | Kronsbein | 55/487 |
| 4,388,086 | 6/1983 | Bauer | 55/316 |

FOREIGN PATENT DOCUMENTS

| | | | |
|---|---|---|---|
| 909894 | 11/1962 | United Kingdom | 55/486 |
| 1013770 | 12/1965 | United Kingdom | . |
| 1479753 | 7/1977 | United Kingdom | 55/275 |
| 2089232 | 6/1982 | United Kingdom | . |

Primary Examiner—Bernard Nozick
Attorney, Agent, or Firm—Pollock, Vande Sande and Priddy

[57] ABSTRACT

Detectable vapors, odors and smells are removed from a stream of compressed air entering a tubular cartridge and passing axially through a cylindrical bonded granular or supported granular sorbent bed or radially through a bonded granular or supported granular tubular sorbent bed arranged so that the air velocity therethrough is not greater than 300 ft/min and the minimum contact time with the granules is 0.1 seconds, the bed being arranged to be traversed by the entire volume of air passing through the cartridge. The air then passes through a surrounding microporous or pleated filter element prior to being discharged radially from the cartridge.

8 Claims, 8 Drawing Figures

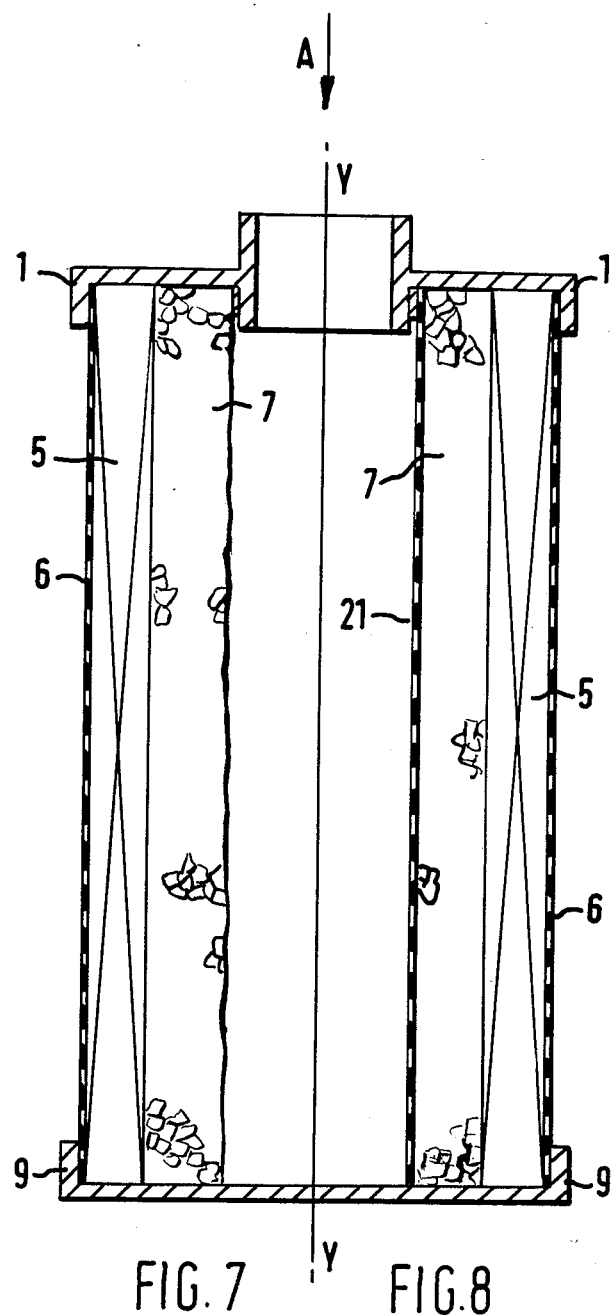

FILTERS FOR PURIFICATION OF GASES

This application is a continuation of application Ser. No. 442,060, filed Nov. 16, 1982, now abandoned.

FIELD OF THE INVENTION

This invention relates to filter cartridges incorporating sorbent beds for application to gaseous purification. The invention is particularly well suited to the purification of compressed air where it is of prime importance to remove all detectable vapor, smells and odors from the air.

DESCRIPTION OF THE PRIOR ART

The art of fluid purification by cartridge filtration is not new. In British specification No. 1,236,396 R. E. Knight et al disclose apparatus for the purification of gaseous media but the example shown in this specification has a sorbent bed that does not use the maximum available volumetric space. Further dust or particle filters positioned after the sorbent bed are of very small proportions thereby giving considerable pressure loss. In British specification No. 1,265,089, Nutter and Sitter disclose a filter cartridge utilizing a pleated bed of activated carbon impregnated filter paper which has two major disadvantages; firstly the maximum space is not utilized and secondly the weight of sorbent material (which is directly proportional to the weight of contaminant which can be removed) is very low as only a fraction of the total weight of paper is sorbent. A further disclosure is specification U.S. Pat. No. 4,015,959 by G. A. Grote which, although using a good sorbent bed design, employs a form of final filtration for capture of dust particles which must be poor, being a textile mesh element. Moreover primary oil separation is effected within the same chamber as the textile mesh and because this is a very elementary method, i.e. using a pan scrubber, there is a very real danger of liquid oil caryover into the sorbent bed.

SUMMARY OF THE INVENTION

A primary object of the invention is to provide a purification cartridge comprising a sorbent bed and filter medium that gives greater efficiency, lower pressure loss and longer life than the prior proposals. A further object is to provide a filter cartridge for the purification of compressed air either at the working pressure of the apparatus with which the cartridge is associated, or during the expansion of the air from its compressed state to atmospheric pressure, for use in conditions where purification is all important for example, for substantially the complete removal of vapors, smells and odors. Examples of the expansion of air through the cartridge to atmosphere occur in relation to exhaust ports of control valves and air driven motors.

According to the invention, a filter cartridge constructed to convey a stream of compressed gas in series first through a bed of sorbent material and then through a tubular filter medium both contained within an elongated rigid support tube extending between end closure members, one of which has a central inlet port for the gas, characterized in that the sorbent bed extends over the full length between locations at or substantially at the end closure members, the sorbent bed being contained along its length by supporting means or being itself a rigid self-supporting unit and being arranged so that when the cartridge is in use for the sorption of molecular size contamination the gas stream passes through the whole length of the bed, longitudinally or radially with respect to a central axis, at a linear velocity of less than 300 feet per minute (12.7 cm/sec.), and that the filter medium is a tubular element surrounding at least a portion of the sorbent bed in such relationship therewith as to receive the total gas stream discharged from the sorbent bed and arrest any particulate contamination such as carryover from the sorbent bed prior to the escape of the gas stream radially from the filter cartridge. In one arrangement the volume advantageously may be defined by a container in the form of a vertical cylinder having the maximum amount of sorbent material packed into it as is permitted by the volumetric constraints of the container. The gas inlet may then be a foraminous area extending over substantially the whole of the top of the bed and the outlet a foraminous cylindrical or other convenient area at the bottom of the container. Alternatively the sorbent bed may be a self-supporting cylinder. The filter medium may be, for example, a pleated filter element or a microfibre tubular element consisting of either molded or fabricated construction. Alternatively, a tubular element of sintered metal or plastics material can be used. Where extremely efficient purification is required, pleated activated carbon paper is preferably provided downstream of the sorbent bed.

In a further example of the invention the sorbent bed is in the form of a tubular self-supporting vertical cylinder contained so that the gas entry area extends substantially over the whole inner surface of the volume and the gas outlet area extends over the whole outer curved surface of the volume. Alternatively, the sorbent bed may consist of granules packed between an inner rigid foraminous tube and the cylindrical filter medium. For particularly efficient removal of vapors, odors and smells from air it is very advantageous to construct the tubular sorbent bed of activated carbon granules with the filter medium consisting of filter paper impregnated with finely divided activated carbon granules, so that the finely divided particles in the filter medium constitute an extension of the sorbent bed, or this filter medium can be surrounded by a further filter medium devoid of the activated carbon particles.

A sorbent is defined as a solid substance which effects a phenomenon termed sorption, and the gas or vapor being sorbed is the sorbate. Sorption is a molecular attraction between the sorbent and the sorbate where molecules of the sorbate are attracted and held to some degree to the surface of the sorbent.

If the molecules of the sorbate are held to the surface by physical forces, similar to that occurring in condensation, the process is termed adsorption. If strong interaction, such as electron transfer, takes place between the sorbate and the surface of the sorbent the phenomenon is chemisorption. If the sorbate enters into the sorbent and reacts chemically with it, changing the chemical nature of each, the process is called absorption.

Since sorption is primarily a surface phenomenon, porous solids having a very high surface area are potentially the most effective sorbents. Typical sorbents are as follows:

(a) Activated Carbon

Sometimes known as activated charcoal this is the most versatile of the sorbents and its millions of pores create an internal surface area of 600 to 1200 $M^2$/gram depending on conditions.

(b) Molecular Sieves

Most molecular sieves are synthetic crystalline zeolites and these have a high affinity for polar molecules.

(c) Activated Alumina

This is a porous aluminum oxide.

(d) Hopcalite

This is a porous granular mixture of manganese and copper oxides and is used primarily as an oxidizing agent, being designed to catalyze the oxidation of carbon monoxide to carbon dioxide at ambient temperatures.

(e) Soda Lime

Commonly used for the sorption of carbon dioxide.

(f) Silica Gel

This is a partially dehydrated colloidal silica. It has a fine pore structure with a large internal surface area and exhibits an affinity for polar molecules such as water vapor. Therefore, it is mainly used as a drying agent and in one form it can show a color change from blue to white indicating the presence of collected water vapor.

DESCRIPTION OF THE DRAWINGS

In order that the invention may be clearly understood and readily carried into effect filters in accordance therewith will now be described, by way of example, with reference to the accompanying drawings in which:

FIGS. 7 and 8 show on opposite sides of a line Y—Y vertical sections through left and right hand halves respectively of two more cartridge filters.

The same reference numerals are used in the Figures for features that are similar in the respective filter cartridges.

Referring to FIG. 1 sorbent material 7 is packed in a tube 4 of metal or plastics material closed at the lower end by an end cap 9 and at the upper end by a foraminous disc 2 of perforated or expanded stainless steel with a layer of porous filter medium 3 interposed between the disc 2 and sorbent material 7. The disc 2 can alternatively be made from another suitable metal or a plastics material in woven or moulded configuration. The filter medium 3 may for example be open pore polyurethane foam, fabric or sintered material in which case the disc 2 may be eliminated.

Figure 1:
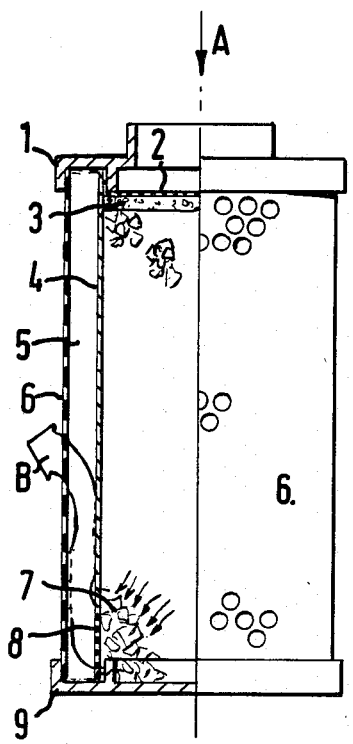
FIGS. 1 and 3 are elevations, one half of each being shown in vertical section, respectively of two different cartridge filters.

A foraminous rigid over support tube 6 of perforated metal or plastics material is mounted between an end cap 1 and the outer periphery of the end cap 9, these caps being resin bonded to the tubes 4 and 6. The cap 1 is formed so as to engage the periphery of the foraminous disc 2 to hold it firmly in position and is resin bonded to said disc. Clearance between the tubes 4 and 6 is provided to accommodate a pleated filter element 5 extending between the end caps with its peaks in contact with the tubes 4 and 6. The efficiency of the filter element 5 is, for example, better than 99.95% efficiency against DOP aerosol, although an efficiency of 99.999% is preferred. The pleated element 5 can include a medium impregnated with activated carbon.

The tube 4 is fluid impervious along the major portion of its length but is formed at its lower end as a foraminous ring 8.

When the filter is used, compressed air to be purified enters as shown by arrow A through a port in the end cap 1 and is distributed by the disc 2 over the top of the sorbent bed 7. The air then passes through the depth of the bed with a sufficient dwell time for molecular size contamination to be removed and the air then passes through the foraminous ring 8 to the lower end of the pleated filter element 5. The air rises up the inner surface of the element 5, while passing through that element leaving particles carried over from the sorbent bed on the inner surface and finally escapes through the foraminous tube 6 as indicated by arrow B. The pore size of the foraminous ring 8 must clearly be small enough to stop particles of the granulated sorbent from passing into the cavities between the tube 4 and pleats of the element 5. The foraminous ring 8 can be replaced by a foraminous disc similar to the disc 2 with a space beneath it providing communication with the pleated filter element 5.

The sorbent material can be in granular or powder form but can also be obtained in fibre form particularly in the case of activated carbon. Self-supporting blocks of activated carbon material typically in cylindrical or tubular shape can be used. These consist of many granules held together by a binder which has a minimum effect on the activity and internal surface area of the activated carbon. Alternatively, sintered blocks of activated carbon can be used. When these sorbents in block form are used, the disc 2 and filter medium 3 can be omitted.

Figure 2:
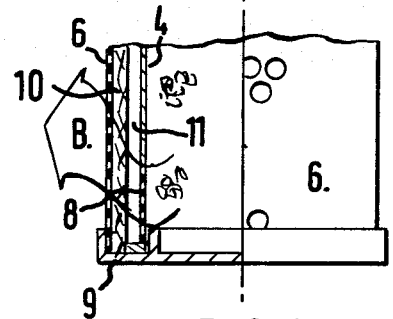
FIGS. 2 and 4 are elevations, one half of each being shown in vertical section, of the lower ends of modifications respectively of the cartridge filters of FIGS. 1 and 3.

FIG. 2 shows a modification of the filter of FIG 1, in which a microfibre tubular element 10 (constructed for example as described in British Specification No. 1603519) replaces the pleated filter element. An air gap 11 is provided between the microfibre element and the tube 4 to enable direct communication between the foraminous ring 8 and the whole inner surface of the microfibre element.

Figure 3:
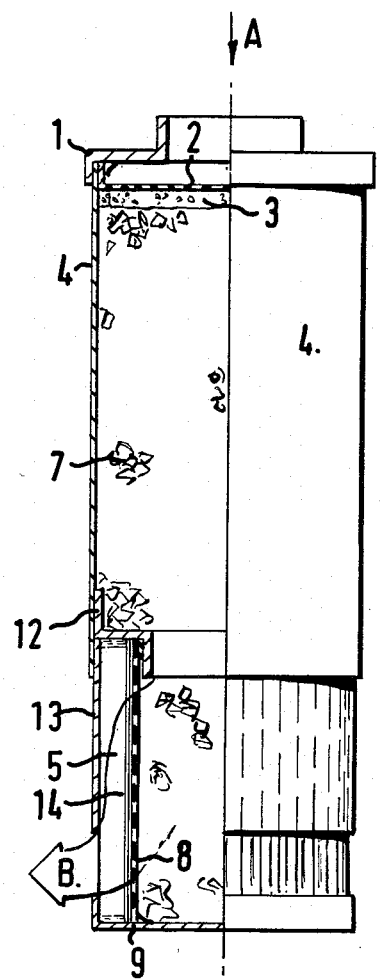

FIG. 3 shows an adaptation of the filter of FIG. 1 to circumstances requiring a greater depth of sorbent bed 7 and a somewhat shorter length of pleated filter element 5. For this an adapter 12 is bonded to the lower end of the tube 4 to locate and seal the upper end of the pleated filter element 5 which extends down between the foraminous ring or tube 8 and a transparent support tube 13 of plastics material, a dye impregnated fabric 14 being interposed between the foraminous tube 8 and the pleated element. The bottom of the assembly is covered and sealed by an end cap 9. The support tube 13 is preferably of plastics material and is perforated to provide the air outlet. Alternatively, when impervious, it can terminate short of the end cap 9 leaving a circumferential air gap. The dye, the pleated element 5 and transparent tube 13 provide an indicator which tells whether oil contamination has been removed from the air prior to the sorbent bed. In that case the pleated element 5 can be seen to remain white. However, if oil finds its way through the foraminous tube 8 and becomes colored in passing through the dye impregnated fabric, it stains the pleated filter element. When this is seen to happen, steps can be taken to replace the sorbent cartridge and when an ultra high efficiency filter is added as described below, this is also replaced.

Figure 4:
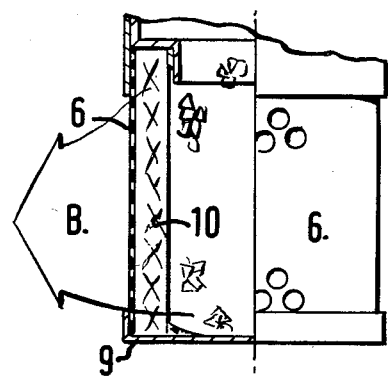

FIG. 4 shows a modification of the filter of FIG. 3 in which the pleated filter element 5 is replaced by a microfibre filter tube 10. This element may simply consist of microfibrous filter paper wrapped inside the foraminous support tube 6 as described in British specification No. 1014882 (Domnick Hunter) and providing direct support for the lower end of the sorbend bed. The color indicator arrangement of FIG. 3 can be incorporated in this filter, as also in those of FIGS. 1 and 2.

Figure 5:
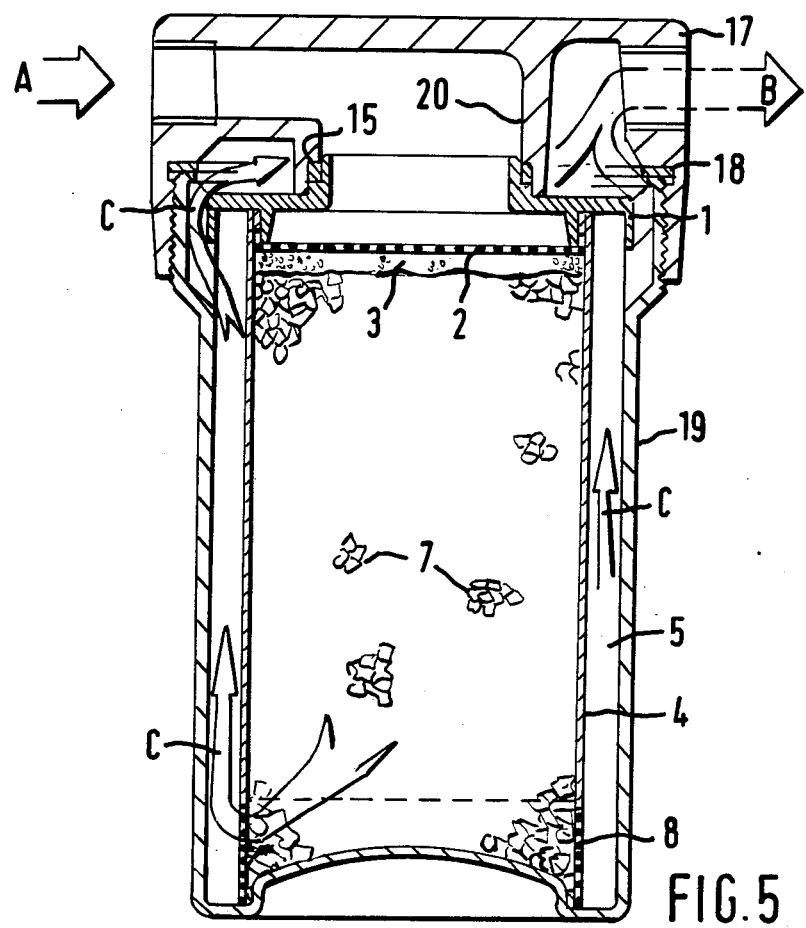
FIG. 5 is a vertical section through a further cartridge filter.
Figure 6:
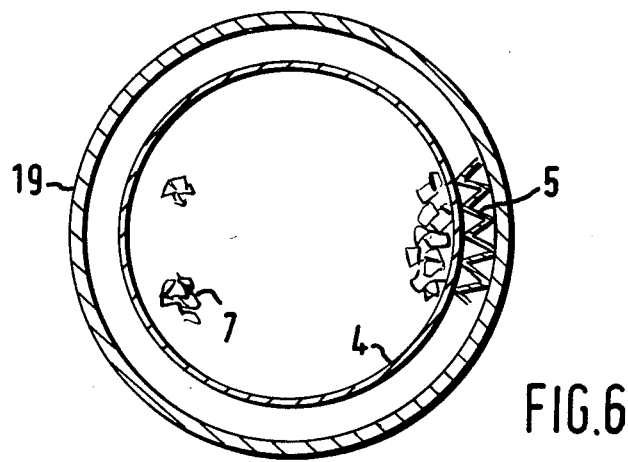
FIG. 6 is a cross-section through the filter of FIG. 5.

FIGS. 5 and 6 demonstrate how very high volumetric use can be made of a sorbent bed within the constraints of a housing consisting of a bowl 19 screwed into a body 17 formed with inlet and outlet ports as indicated by arrows A and B. In this case the bowl 19 and purifying system comprising the sorbent bed 17 and pleated filter element 5 are constructed as a unit which can be disposed of at the end of its useful life and replaced by another. The bowl provides an imperforate support tube for the pleated element and also provides the lower end cap. The purified air flows upwards outside the pleated filter to an expanded top end of the bowl as indicated by arrows C. After flowing over the edge of the end cap 1 and round a socket 20 for the inlet part of the end cap 1, the purified air leaves the assembly through the port B. A gasket 15 is provided between the end cap 1 and the socket 20 through which the air to be purified is supplied to the sorbent bed. A gasket 18 is fitted between the top of the bowl 19 and the body 17.

Due to the air impervious walll of the bowl 19 the air must travel through the depth of the sorbent bed 7 thus giving the best possible efficiency in removing the sorbate. The granular sorbent is packed in such a way as to avoid the possibility of free paths through the bed and the granule size is chosen for optimum performance. It should be noted that the sorbent bed could consist of more than one layer of different sorbents. For instance when purifying gas using hopcalite for oxidizing carbon monoxide into carbon dioxide great care must be taken to remove other sorbates which can poison the catalytic action toward carbon monoxide. In particular the moisture should be removed from the gas by another sorbent such as anhydrous calcium chloride sited upstream of the hopcalite. It is also prudent to have another smaller layer of drying agent immediately downstream of the hopcalite to protect it during storage and installation.

When the color change indication is required the bowl 19 is made from a transparent plastics material and the dye containing layer is sited as in FIG. 3, ie. between the foraminous ring 8 and the pleated element 5.

This invention can be advantageously used for the total removal of oil from compressed air especially in applications such as the provision of purified breathing air and pneumatic instrumentation. In both these cases the sorbent material is activated carbon. To protect the sorbent from bulk liquid oil, a high efficiency oil removal filter typically using borosilicate glass microfibre with an efficiency of better than 99.999%. when tested in accordance with Military Standard 282 (DOP) can be used immediately upstream. The arrangement can then be such that two pressure containing housings are used immediately adjacent to each other, the upstream one containing the ultra high efficiency (UHE) filter element and the other the sorbent bed. Alternatively, a single housing can be used with two separate pressure containing chambers one above the other. Then the lower chamber contains the UHE filter element whereby re-classified oil aerosol is drained away by normal devices and the air then directed by an internal porting arrangement within the housing configuration into the sorbent containing cartridge in the upper chamber. In both cases replaceable cartridges (with or without color indication) as shown in FIGS. 1, 2, 3 and 4 can be used or cartridges with an integral filter bowl as shown in FIGS. 5 and 6.

It has been shown that oil carryover from UHE filters can vary depending on conditions, but typically 0.1 mg/m$^3$ of oil in aerosol form is not uncommon. Oil vapor phase is always present and again typically 0.1 mg/m$^3$ is not uncommon. The combined result is an unpleasant oily odor of hydrocarbon vapors and fine aerosols, for example less than one micron diameter.

A sorbent bed of activated carbon granules is ideal for removal of this contaminant leaving an oil concentration in the exit air of less than 0.001 mg/m$^3$ and resulting in an odor condition. The air having gone through this process is perfectly suited for breathing air or instrument use, and is especially suited when the air flow rate is <5% of maximum rated flow. The activated carbon bed has an efficiency of >99.9% for the removal of oil vapor and >99.999% for particle removal when tested to BS 4400. The weight of sorbent bed material used is proportional to the life of the sorbent material and the activated carbon material can hold up to 50% of its own weight in adsorbed vapors.

When a pleated filter medium is used for the final filtration, ie. element 5, this can advantageously be a combination of activated carbon impregnated paper with a normal filter paper on the downstream side (for particle retention). It is recognized that the finely divided activated carbon particles used in such filter papers have a greatly increased surface area and are generally far more active than larger granules. It is therefore very desirable to utilize this medium in the final stage of purification to removal any small traces of vapor which may carryover from the sorbent bed. This type of impregnated paper is supplied by C. H. Dexter of Windsor Locks, Conn., USA.

Test work has shown that in the case of cartridge filters such as shown in FIGS. 1, 3 and 5 and employing a sorbent bed of granular activated carbon with pleated activated carbon paper for the filter medium, the overall efficiency, as indicated above, can be better than 99.9% when removing hydrocarbon vapors. Such work has also shown that the granular bed removes the bulk of the vapors, typically 93%, while the activated carbon paper removes the remainder. For some applications, however, such filter cartridges are unsuitable because the operating pressure loss is too high when the required contact time between the air and carbon granules is maintained. It has been calculated and proved by experiments that in order to obtain the maximum sorption efficiency through the bed of activated carbon, the velocity of the gas should not exceed 300 feet (91.50 m.) per minute and the gas must have a minimum contact time of 0.1 seconds. The contact time is a function of the depth of the bed and the velocity at which the air passes through it. To accommodate these conditions it has been found that the volume of carbon granules can advantageously be packed into the form of a comparatively thick walled tube.

Such a tubular volume 7 of activated carbon is shown in FIG. 7 as a rigid self-supporting tube having the granules heat fused together. If desired, a binder may be added. In operation the compresed air enters the center of the granular tube in the direction of the arrow A and along the length of the tube escapes essentially radially outwards through the granular tube wall to a pleated activated carbon paper filter element 5 surrounding and closely contacting the granular tube 7. A foraminous rigid outer tube 6 supports the pleated element. End caps 1, 9 are sealed to the ends of the granular tube 7, the pleated element 5 and the foraminous tube 6. The granular tubular sorbent bed 7 effects a reduction in gas velocity while maintaining satisfactory sorption efficiency without excessive pressure loss.

FIG. 8 shows a modification of the tubular structure of FIG. 7 in which the granules of activated carbon are loose but packed to provide a sorbent bed 7 in an annular space between an inner rigid foraminous tube 21 and the pleated activated carbon filter element 5.

In FIGS. 7 and 8, the granular activated carbon bed 7 provides first stage bulk vapor capture action and the pleated paper a second stage having a high vapor removal efficiency due to the large surface area of the carbon particles as indicated above. The pleated paper also acts as a dust filter to prevent any particles given off by the granules from going downstream.

It is essential to keep the sorption bed in a dry condition, particularly in compressed air systems where oil and water are usually present. For example, when the cartridge is to be used to purify the exhaust gases of vacuum pumps, particularly oil injected rotary vane pumps, the liquid contamination must be removed upstream. This can be done by a separate filter located at an indefinite distance from the filter cartridge.

The tubular cartridges of FIGS. 7 and 8 can advantageously be used in conjunction with compressed air filter silencers, such as those shown in U.K. patent application No. 7935745 (U.K. publication No. 2033247) because although filter silencers remove dirt and liquid contamination while reducing noise levels they do not remove oily odors. In this arrangement the tubular sorbent cartrdige is sealed onto the casing of the filter silencer by means providing an intervening space ensuring that the sorbent material remains dry.

When color indication is provided, and the bowl 19 (FIG. 5) is of metal or other non-transparent material, the bowl may be fitted with a sight glass enabling any color change indicating oil contamination of the sorption unit to be viewed. For the dye impregnated fabric, the impregnation may be with waxoline red manufactured by ICI by using an organic solvent carrier. This changes the color of oil from natural to deep red and the dye is not affected by water. The sight glass can be a standard sight level indicator which is commonly used on metal filter bowls.

The employment of a duplex cartridge filter system is sometimes desirable as the sorbent bed has a predetermined life depending on the size of the bed and the concentration of sorbate. In the duples system two sorbent beds are used in parallel and the air valved between either one or the other thereof allowing a replacement to be fitted without interruption of the air supply. The sorbent in some instances can be regenerated or reactivated but generally this is an expensive and time consuming operation. In a further embodiment a duplex system is envisaged which has a valve system and a timer means which either automatically operates the change over of a used sorbent cartridge to a new one and/or gives an audible alarm indicating the necessity for manually changing the sorbent cartridge.

The hardware material used in the construction of the filters should be corrosion resistant and can, for example, be a plastics material, aluminum, stainless steel, or a corrosion resistant mild steel such as tin plate.

We claim:

1. A filter cartridge comprising:
    an elongated rigid support tube having a major portion of the length of its wall impervious to the passage of gas therethrough an a minor portion of the length of its wall extending from one end of said major portion and arranged for the discharge of gas peripherally around said tube from the inside to the outside thereof;
    a pair of end closure members respectively applied to the ends of said support tube, the end closure member remote from said minor portion being formed with an inlet port;
    a single bed of sorbent carbon material contained within said support tube and arranged for the removal of molecular size contamination from a gas stream when flowing from said inlet port, said bed completely extending over the full length of said support tube between locations substantially at said end closure members and consisting of one closely packed mass of material in the form of a column which consists of porous solids throughout the volume of said column, the flow of the gas stream from said inlet port taking place substantially through the whole length of said bed in a single direction longitudinally with respect to the central axis of said column before being discharged peripherally from said tube; and
    a filter medium arranged in series with said sorbent bed to receive the gas stream discharged from said sorbent bed, said filter medium being operative to arrest any particulate material carried over from said sorbent bed and then to discharge the gas stream immediately from the cartridge, said filter medium being a filter element located immediately adjacent said sorbent bed and so positioned that the gas discharged from said sorbent bed flows radially outward from said sorbent bed through the filter element to be discharged radially outward of said cartridge through said filter element.

2. A filter cartridge according to claim 1 in which said sorbent bed is designed in relation to the system with which it is to be used so that when in use the gas passes through said bed at a linear velocity of less than 300 feet per minute with a minimum contact time of 0.1 seconds with the sorbent bed.

3. A filter cartridge according to claim 1 in which said filter element is tubular and surrounds a portion only of said sorbent bed.

4. A filter cartridge according to claim 1 in which said sorbent bed presents a gas entry area extending over the whole of the top of said sorbent bed and a gas outlet area encircling a lowermost portion of said sorbent bed.

5. A filter cartridge according to claim 1 in which said filter element is a microfibre filter tube.

6. A filter cartridge according to claim 1 wherein said cartridge includes a fabric impregnated with a dye interposed between said sorbent bed and said filter medium whereby the apperance of dye colored oil on the filter medium will indicate oil contamination of said gas stream.

7. A cylindrical filter cartridge for purifying a stream of gas while passing through the cartridge, the cartridge including elongated rigid support tube means and two end members respectively covering opposite ends of said support tube means, one of said end members being formed with a central inlet port for the gas stream and the other of said end members being constructed to prevent the passage of gas therethrough, a compact sorbent bed mounted as a unit within said support tube means and comprising a single essentially solid column of sorbent material that extends completely over the full length of said cartridge between locations that are respectively disposed substantially at said end members, said sorbent bed unit presenting at its upper end a gas entry area adjacent said inlet port that feeds into only one closely packed column of porous solid material having a high internal surface area to the gas stream passing via said gas entry area through said column of material, said support tube means comprising an upper wall portion impervious to the passage of gas therethrough and a lower wall portion pervious to the passage of gas therethrough to provide a peripheral gas outlet area from said bed, and a tubular filter element located within said support tube means adjacent substantially only said pervious lower wall portion, the total gas stream discharged from said sorbent bed unit passing radially through said filter element and then escaping radially outward from said cartridge via said pervious lower wall portion of said support tube means, said filter element being effective to arrest any particulate contamination which is carried in said gas stream from said sorbent bed unit, and said sorbent bed unit being formed in relation to the cartridge to carry the gas stream at a linear velocity less than 300 feet per minute with a minimum contact time of 0.1 seconds with said sorbent bed while removing molecular size contamination from the gas stream as the gas stream passes through the entire volume of said sorbent bed unit from said inlet port to said peripheral gas outlet area of said sorbent bed unit.

8. A cylindrical filter cartridge for purifying a stream of gas while passing through the cartridge, the cartridge comprising a container in the form of a vertical cylinder and including two end members respectively covering opposite ends of said container, one of said end members being formed with inlet means for the gas stream and the other of said end members being constructed to prevent the passage of gas therethrough; a single compact sorbent bed mounted in the form of an essentially solid column that extends substantially completely over the full length of said container between locations that are respectively disposed substantially at said closure members, said sorbent bed comprising only one closely packed column of porous solid material which presents a high internal surface area to the gas stream; said cylinder consisting of a wall that is impervious to the passage of gas therethrough along a major portion of its length and a coaxial extension of said wall consisting of a foraminous rigid tube and a tubular filter medium fitting inside said foraminous tube whereby the gas being filtered flows longitudinally through a major portion of said sorbent bed from said inlet means and through the entire volume of said sorbent bed prior to being discharged radially through said filter medium and foraminous tube and so radially from the cartridge, said filter medium being effective to arrest any particulate contamination which is carried in said gas stream from said sorbent bed.

* * * * *